Fig. 1.

INVENTORS
PAUL E. BROCKERT
DAVID R. GORDON
ROBERT K. SKINNER
JOSEPH C. WHITMER
BY D. C. Staley
ATTORNEY

Fig. 3A.

INVENTORS
PAUL E. BROCKERT
DAVID R. GORDON
ROBERT K. SKINNER
JOSEPH C. WHITMER
BY D. C. Staley
ATTORNEY

Fig. 3B.

INVENTORS
PAUL E. BROCKERT
DAVID R. GORDON
ROBERT K. SKINNER
JOSEPH C. WHITMER
BY D. C. Staley
ATTORNEY

Fig. 4.

United States Patent Office 3,007,529
Patented Nov. 7, 1961

3,007,529
SYNCHRONIZING AND SYNCHROPHASING SYSTEM FOR PROPELLERS
Paul E. Brockert, Tipp City, David R. Gordon, West Milton, Robert K. Skinner, Dayton, and Joseph C. Whitmer, Bradford, Ohio, assignors to General Motors Corporation, Detroit, Mich., a corporation of Delaware
Filed Dec. 24, 1956, Ser. No. 630,234
21 Claims. (Cl. 170—135.29)

This invention pertains to propellers, and particularly to a synchronizing and synchrophasing system for a plurality of variable pitch propellers.

It has long been recognized that an aircraft having a plurality of engine-propeller combinations must include means for synchronizing the speeds of the several prime mover propeller combinations to reduce the vibration level and eliminate noise beats. While these criteria are not essential from a safety standpoint, they greatly improve the passenger comfort. In addition it has been recognized that in order to reduce the noise level to a minimum, it is desirable to maintain a predetermined phase relationship between the blades of the several engine-propeller combinations. This mechanism is called a phase synchronizer, or synchrophasing system, and the precise angular relationship to be maintained varies with different installations, the one to be used being dependent upon that which produces a minimum noise level. In other words, in some instances it may not be necessary to maintain the blades of the several propeller combinations in exact in-phase relationship, since the noise level may be at a minimum when the blades are maintained at a predetermined out of phase relationship. This invention relates to synchronizing and synchrophasing control means for a plurality of variable pitch propellers of the type having constant speed governors.

Accordingly, among our objects are the provision of means for synchronizing the speeds of one or more slave propellers with that of a master propeller; the further provision of an electromechanical synchronizer system for a plurality of variable pitch propellers; the further provision of means for maintaining a predetermined phase relationship between one or more slave propellers and a master propeller; the further provision of an electronic phase synchronizer for a plurality of variable pitch propellers; and the still further provision of an electronic control system for modifying the operation of a constant speed variable pitch propeller.

The aforementioned and other objects are accomplished in the present invention by incorporating means for adjusting the speed setting of the constant speed governor valve assembly for synchronizing the speeds of the slave propellers with that of a master propeller, and by the further incorporation of means for hydraulically biasing the constant speed governor valve assemblies of the slave propellers by an electronic acceleration and synchrophasing control system so as to maintain a predetermined phase relationship between the blades of the slave propellers and the blades of the master propeller. Specifically, each propeller is of the type disclosed in copending application, Serial No. 572,348, filed March 19, 1956, in the name of Roy C. Bodem et al., and assigned to the assignee of this invention. Thus, each propeller is of the variable pitch type wherein each blade is actuated by an independent torque unit, or servo motor, and the pitch adjustment of all the blades in each propeller hub is co-ordinated by a master gear. Each propeller hub has attached thereto and rotatable therewith a regulator assembly. The regulator assembly contains a quantity of oil and a hydraulic system for pressurizing the oil and distributing the pressurized oil to the torque units so as to maintain propeller speed substantially constant in the governed range of operation, as well as including means for feathering the propeller blades, effecting operation in manually selected blade angles, and moving the blades to a fully reversed position. During constant speed operation, the flow of oil is controlled by a constant speed governor valve assembly. The constant speed governor valve assembly is centrifugally responsive, and the speed setting thereof is determined by an opposing spring.

In order to synchronize the speeds of the slave propellers with that of a master propeller, means are incorporated for varying the stress, or opposing force, of the spring. The speed setting of the constant speed governor valve assembly can only be adjusted by the electromechanical synchronizer within predetermined limits, for instance, a maximum of two percent on either side of a nominal, or optimum, governing speed. Assuming the nominal governing speed is 1020 r.p.m., it follows that the maximum high speed setting of the synchronizer is 1040 r.p.m., and the minimum low speed setting of the synchronizer is 1000 r.p.m. In addition, the speed setting of the constant speed governor valve can be raised to 1105 r.p.m. to check out operation characteristics of the engine fuel governor.

The control parameter for electro-mechanical synchronizing is derived from a tachometer generator, one of which is driven by each propeller at a speed proportional to the speed of propeller rotation. In the disclosed embodiment, either of two propellers can be selected as the master, and thus, in a four propeller system three propellers are slaved to the master. The tachometer generators are of the three phase alternating current type, and the output of each slave propeller driven tachometer generator is supplied to the stator of a differential electric motor. In a four propeller system, three differential electric motors are employed, and the rotor windings of the differential electric motors are energized from the tachometer generator of the master propeller. The principle of operation of a differential electric motor is well known in the art, and suffice it to say that when the speeds of the slave propellers differ from that of the master propeller, rotation will be imparted to the rotor of the differential motor of each master-slave propeller combination. The rotor of each differential motor is connected by means of brushes to a stationary multibar commutator. In the disclosed schematic embodiment, the commutator includes three bars, or segments. One bar can be connected through a synchronizer "on"-"off" switch to a source of direct current voltage. A second bar is connected by wire to one side of a split field series electric motor through a power boosting relay. The third bar is connected to the other side of a split field series electric motor through a power boosting relay.

Each of the propellers includes a split series electric motor incorporated in a rotary type actuator mechanism of standard design for adjusting the speed setting of the constant speed governor valve assembly disposed within the propeller regulator. The physical means of adjusting the constant speed propeller governor valve assembly which rotates with the propeller, while the actuator motor does not rotate therewith, is disclosed in the aforementioned copending application, Serial No. 572,348, and thus constitutes no part of this invention. Each of the actuator motors includes limit switches which are actuated by suitable cams for determining the nominal high and low speed settings of the governor valve assembly. In addition, each motor includes a pair of centering switches for obtaining the normal centered speed setting. Furthermore, each electric motor actuator includes a high limit switch for establishing the high speed limit for the fuel governor check. The actuator motors of the slave propellers are automatically energized by the differential motor commutator and power relay combinations so as to adjust the speed setting of the slave constant speed governor valve assemblies so as to maintain the speeds of the slave propellers in synchronism with that of the master propeller during speed synchronization. When speed synchronization is not desired, the actuator motors are automatically moved to the center position. The high speed fuel governor check can be manually selected by the pilot.

As alluded to hereinbefore, the constant speed governor valve assembly of each propeller can be hydraulically biased. The hydraulic biasing means includes a solenoid valve connected in a parallel flow path with the governor valve to the torque units of each propeller. Energization of the solenoid valve is controlled by an electronic system including acceleration sensitive means together with means for establishing and maintaining a predetermined phase relationship between the blades of the slave propellers and the master propeller. The control signals for actuating the electronic system are likewise derived from the three phase tachometer generators driven by each propeller. Likewise, in the synchrophasing system, either of two propellers can be selected as the master, with the remaining three being slaved thereto. Moreover, it is specifically pointed out, that at no time are the electro-mechanical synchronizer and the electronic phase synchronizer operated together. That is, when the electro-mechanical speed synchronizer is operating, the electronic phase synchronizer is off, and likewise the converse is true. Furthermore, it is pointed out that the steps necessary to obtain the desired phase synchronization require that the propeller speeds be first synchronized. Thus, the proper procedure is to turn on the electro-mechanical speed synchronizer and after the speeds of the several propellers are synchronized, to turn off the speed synchronizer and turn on the phase synchronizer. In this manner the slave propellers should lock in the desired phase relationship with the master propeller.

The rotors of the differential electric motor of the slave propellers are also mechanically connected to a pair of brushes which engage a second stationary commutator assembly, including an even number of commutator bars. In the schematic embodiment disclosed, these commutators include four bars, or segments. The bars are connected alternately to ground, and to a source of direct current voltage through an off-on switch. By means of differential motor driven brushes two adjacent bars can be connected to opposite terminals of a reversible direct current motor. The reversible direct current motor is mechanically connected to a wiper of a differential potentiometer assembly. The winding of the differential potentiometer is mechanically connected to the rotor of the differential electric motor. The output of the differential potentiometer is applied to the electronic control system. In addition the electronic control system is energized, or receives a control signal, from one phase of each tachometer generator driven by each propeller. Thus, the inputs to the electronic control system includes components proportional to acceleration, the instantaneous difference in the speeds between the slave and master propellers, a speed synchronization component, and a phase position component. The control circuits for the electronic system are such that in certain instances, only the acceleration component is utilized to actuate the solenoid valve so as to hydraulically bias the constant speed governor valve. This is desirable since the acceleration control may aid in preventing undesirable hunting of the propellers during constant speed operation. However, during phase synchronization all four components are supplied as input signals to the electronic system so as to control the output thereof and thereby energize the solenoid valve to hydraulically bias the constant speed governor valve and maintain the predetermined phase relationship between the blades of the slave propellers and the blades of the master propeller. In any event, the solenoid valve cannot bias the setting of the constant speed governor valve assembly more than one percent in either direction. In other words, the maximum biasing effect of the solenoid valve about the nominal centering speed of 1020 r.p.m. is a maximum of 1030 r.p.m. and a minimum of 1010 r.p.m.

Further objects and advantages of the present invention will be apparent from the following description, reference being had to the accompanying drawings wherein a preferred embodiment of the present invention is clearly shown.

Figure 1:
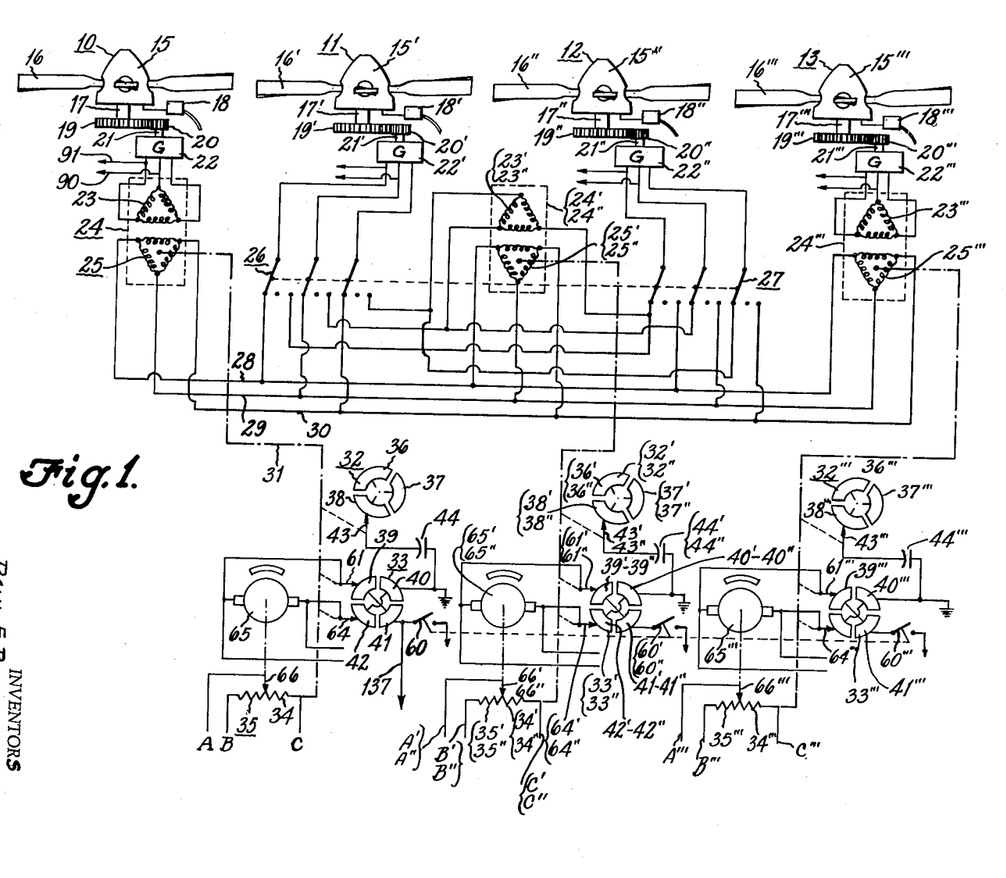
FIGURE 1 is a schematic view of a control system for a plurality of variable pitch propellers constructed according to this invention.

With particular reference to FIGURE 1, a multiple propeller aircraft installation is schematically shown. Thus, the installation includes four variable pitch propellers which are designated in their entirety by numerals 10, 11, 12 and 13. Hereinafter, similar components of the propellers 10, 11, 12 and 13 will be indicated by similar numerals with primes affixed. Thus, the propeller 10 includes a spinner 15 having cutouts through which blades 16 project. The blades are rotatable about their longitudinal axes to different pitch positions, the range of pitch positions including full reverse and full feather. The propeller 10 is rotated about its horizontal axis by a shaft 17 driven by a suitable prime mover, such as a gas turbine, not shown. The spinner 15 encloses a hub, not shown, and attached to the rear thereof is a regulator assembly, likewise not shown. Reference to the aforementioned copending application Serial No. 572,348 will indicate that the rotatable regulator assembly includes a stationary adapter assembly to which control levers are attached for transmitting motion between the stationary and rotating parts of the regulator assembly. One of the control levers is attached to and driven by a direct current actuator motor indicated by numeral 18. The actuator motor 18 is employed to adjust the speed setting of the hydraulic constant speed governor valve assembly disposed within the regulator, as will be pointed out more particularly hereinafter.

In addition, each propeller shaft 17 has a gear 19 thereon which meshes with a gear 20. The ratio between gears 19 and 20 is four to one, in other words, the gear 20 is driven four revolutions for every single revolution of the gear 19. The gear 20 is attached to a shaft 21 which is in turn attached to the rotor of a two-pole three phase tachometer generator 22. The three phase alternating current developed by the tachometer generator 22 is applied to the stator winding 23 of a differential motor designated by the numeral 24. Only three differential electric motors are incorporated in the four propeller installation, the reason therefore to be pointed out hereinafter. Thus, one of the differential motors is indicated by 24' and 24", since this differential motor is connectible with either propellers 11 or 12 in a relationship to be set forth. Each differential motor also includes a rotor 25 having windings.

In the propeller installation shown herein, either propeller 11 or propeller 12 can be selected as the master, with the remaining propellers operating as slaves thereto. Therefore, the tachometer generators 22' and 22" have their output wires connected to switches 26 and 27 respectively. The switches 26 and 27 are interconnected, or ganged, and are of the three pole type. As shown in FIGURE 1, the switches 26 and 27 are positioned so that propeller 11 is the master and propellers 10, 12 and 13 are slaves thereto. Thus, the output of tachometer generator 22' is applied to wires 28, 29 and 30 which are connected respectively to the rotor windings of differential electric motors 24, 24′ and 24″ and 24‴. In addition, the switches 26 and 27 can be moved so as to render propeller 12 the master and propellers 10, 11 and 13 slaves thereto so that the output of tachometer generator 22″ is connected to the windings of the rotors of the differential electric motors.

The rotor 25 of the differential electric motor 24 is drivingly connected by linkage 31 to an odd number bar commutator assembly 32, an even number bar commutator assembly 33 and a winding 34 of a differential potentiometer indicated by numeral 35. The commutator assembly 32 is shown having three bars, or segments, 36, 37 and 38. The commutator assembly 33 is shown having four bars 39, 40, 41 and 42. It is pointed out that there are only three three-bar commutators 32, 32′ and 32″ and 32‴. Similarly, there are only three four-bar commutators 33 and there are only three differential potentiometer assemblies 35. The reason for this should be readily apparent, since either propeller 11 or 12 can be selected as the master to which the remaining propellers are slaves.

As seen in FIGURE 1, the stationary commutator segment 38 is engaged by a differential motor driven brush 43 which is connected by slip ring mechanism to one side of a condenser 44, the other side of which is connected to ground. As the differential motor driven brush revolves in respect to commutator 32, the brush 43 sequentially engages segments 38, 37 and 36 during its rotation in a counterclockwise direction, and sections 38, 36 and 37 during its rotation in a clockwise direction. It will be appreciated that when the speed of the slave propeller 10 is less than the speed of the master propeller, the brush 43 engaging commutator 32 will be driven by the differential electric motor in one direction, while when the speed of the slave propeller is greater than the speed of the master propeller the brush 43 engaging commutator 32 will be rotated in the opposite direction. In the particular embodiment disclosed, the brush 43 is rotated in the counterclockwise direction when the speed of the slave propeller 10 is less than the speed of the master propeller, and is rotated in the clockwise direction when the speed of the slave propeller is greater than the speed of the master propeller.

Figure 2:
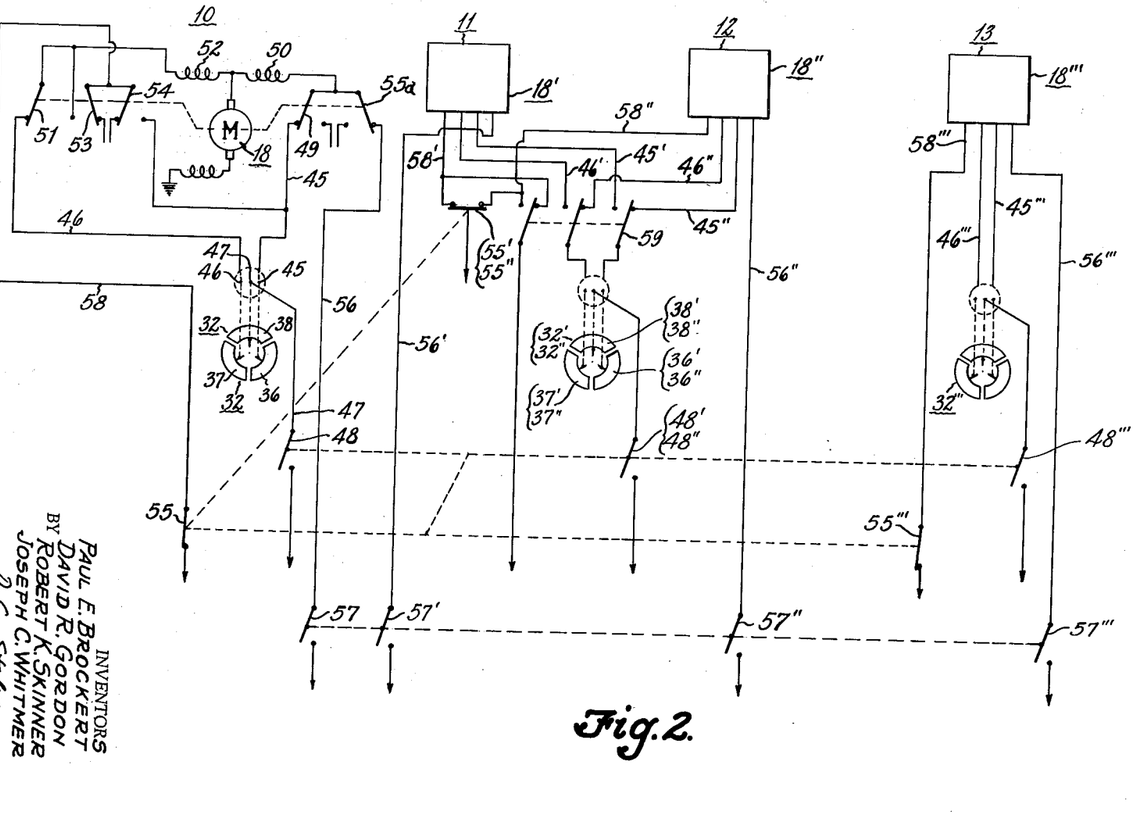
FIGURE 2 is a schematic drawing of the electro-mechanical speed synchronizing system constructed according to this invention.

With particular reference to FIGURE 2, wherein similar numerals denote similar parts, it can be seen that the commutator sections 36, 37 and 38 are connected to wires 45, 46 and 47, respectively, of a cable. Wire 47 is connected to a synchronizer "on"-"off" switch 48 which, when closed, applies 28 volts direct current windings to the commutator segment 38. Wire 45 is connected to a limit switch 49 through a power boost relay, not shown, which is in turn connected to one winding, namely the increase speed winding 50 of the split series reversible direct current motor 18. Wire 46 is connected to a limit switch 51 through a power boost relay, not shown, to the other winding, namely the decrease speed winding 52 of the direct current reversible motor 18. The limit switch 49 is automatically opened by a cam mechanism, not shown driven by the motor 18 when the maximum synchronizing speed, namely 1040 r.p.m. is reached. Conversely, the switch 51 is opened by a cam mechanism, not shown, driven by the motor 18 when the minimum synchronizing speed, namely, 1000 r.p.m. is attained.

The actuator motor 18 also includes a pair of cam operated centering limit switches 53 and 54, which are operable to interrupt the application of electric power to motor 18 so as to reset the hydraulic governor valve to the nominal speed setting of 1020 r.p.m. when the centering switch 55 is closed. The limit switches 53 and 54 are shown in the open position in FIGURE 2, and are actuated by slow speed cams, not shown, driven by the motor 18. There is a sufficient dead band between actuation of limit switches 53 and 54 to prevent hunting, or fluctuation, about the nominal speed setting of the governor. It is pointed out that when the synchronizing switch 48 is closed the centering switch 55 is open, and vice versa. In other words, switches 48 and 55 are interlocked.

Energization of the motor 18 is controlled in the following manner when the centering switch 55 is closed. If the governor speed setting is more than 1020 r.p.m., limit switch 54 will be open and limit switch 53 will be closed. Accordingly, when the centering switch is closed the decrease speed winding 52 of the motor 18 will be energized through wire 58 and the switch 53. When the speed setting of the governor has been reduced to the nominal speed setting, namely 1020 r.p.m., the limit switch 53 will be opened to deenergize the motor 18. Conversely, if the governor speed setting is less than 1020 r.p.m., the limit switch 53 will be open and limit switch 54 will be closed. Therefore, when the centering switch 55 is closed, the increase speed winding 50 of the motor 18 will be energized through the wire 58, the switch 54 and the switch 49. When the nominal speed setting of 1020 r.p.m. is obtained, the switch 54 will be opened to deenergize the motor 18.

The electric actuator motor 18 also includes a cam actuated upper high speed limit switch which is used to check the sensitivity of the turbine fuel governor. This limit switch is designated by numeral 55a and is connected by wire 56 to a fuel governor switch 57. It is pointed out that each of the actuator motors includes a fuel governor check switch 57. When the fuel governor check valve 57 is closed with the centering switch 55 open, the increase speed winding 50 of the motor 18 will be energized through wire 56 and limit switch 55a. When the governor setting has been adjusted to maximum speed, namely 1105 r.p.m., the switch 55a will be opened to deenergize the motor 18.

Referring again to FIGURE 2, it is noted that the motors 18′ and 18″ which are associated with propellers 11 and 12 have wires 45′, 46′ and wires 45″ and 46″ respectively as well as wires 58′ and 58″ connected to contacts of a switch 59 which is the master propeller selector switch. As shown in FIGURE 2, propeller 11 has been selected as the master and propellers 10, 12 and 13 operated as slaves thereto. When the switch 59 is moved to the other limit position, propeller 12 is the master propeller and the remaining propellers are slaved thereto. Thus, in the master propeller as shown in FIGURE 2, 28 volts is applied to the centering wire 58′ so as to actuate the motor 18′ and move the constant speed hydraulic governing valve of propeller 11 to the nominal centering speed position of 1020 r.p.m. On the other hand, when propeller 12 is the master, propeller 11 is under the control of the commutator 32.

Operation of the electro-mechanical speed synchronizer is as follows. With the master selector switch 59 in the position of FIGURE 2, propeller 11 is the master and propellers 10, 12 and 13 will be slaves thereto. Since propeller 11 is the master, the actuator motor 18′ is moved to the center position since 28 volts direct current voltage is supplied to wire 58′ through the switch 59. Thus, the master motor propeller combination 11 has its governor calibrated for a speed of 1020 r.p.m. Should propellers 10, 12 or 13 deviate from the speed of the master propeller 11, the respective commutators 32 will be driven by the differential motors thereby exciting the respective actuator motors so as to readjust, or calibrate their governors until their speeds are in synchronism with the master propeller 11. The manner in which the actuator motors 18 are energized during rotation of the commutator 32 is as follows. As the brushes rotate on the commutator 32 in the counterclockwise direction as viewed in FIGURE 2, thereby indicating that the speed of the slave propeller is less than the speed of the master propeller, the condenser 44 will first be charged when the brush 43 engages segment 38. Thereafter the condenser will be discharged through segment 36 when brush 43 engages segment 36. Thus, the winding 50 of the split series motor 18 will be energized through a power boost relay, not shown, so as to increase the speed setting of the hydraulic governor valve of propeller 10. Conversely, during periods when the slave propellers are rotating at a speed exceeding the speed of the master propeller, the condenser 44 will be discharged through segment 37 and wire 46 so as to excite the motor 18 and reduce the speed setting of the constant speed governor valve in the slave propeller.

When it is desired to employ propeller 12 as the master, the switch 59 is moved to its other limit position. When the synchronizer "on"-"off" switches 48 are actuated, the centering switches 55 are closed and the motors 18 are energized until they reach their center positions, at which time the limit switches 53 and 54 open automatically to deenergize the motor. When it is desired to check the sensitivity and operation of the turbine fuel governor, the switches 57 are closed so as to calibrate or adjust the constant speed governors to the maximum speed position, namely 1105 propeller r.p.m. at which time the operation of the turbine fuel governor can be checked.

Referring again to FIGURE 1, attention is directed to the fact that when the phase synchronizing master selector switch 26 is in either the master 11 or master 12 position, the electro-mechanical synchronizer can be in either the "on" or "off" position. As alluded to hereinbefore, the tachometer generators 22 are driven at four times the speed of the propellers. This type of operation is essential since the propellers 10, 11, 12 and 13 are four bladed units, and thus a complete alternating signal is obtained from the generators 22 for each 90° of propeller rotation, or in other words, for each blade. Since in phase synchronizing it is only necessary to maintain a predetermined phase relationship between any of the blades of the master and slave propellers, this four to one step-up drive arrangement can be effectively utilized as will be pointed out more particularly hereinafter.

When the master phase synchronizer selector switch is either in the master 11 or the master 12 position, the differential electric motors 24 will rotate at twice the error speed between the master and the slave propellers since the tachometer generators have two poles and the differential motors have four poles. In other words, for every one propeller revolution difference between a slave and the master, the differential electric motor will rotate two revolutions. Since the differential electric motors drive the brushes 61 and 64 which engage the four bar commutators 33, a 90° blade shift will represent 180° relative angular movement between the brushes and the commutators. Thus, with a four bladed propeller there will be two null positions during each revolution of the brushes 61 and 64. The phase synchronizer "on"-"off" switch is designated by numeral 60, and the switches 60, 60′, 60″ are interconnected. When the phase synchronizer is "on," as aforementioned, the commutators 33 have two null positions, at which the blades are in a certain predetermined phase relationship of minimum noise level. The commutator bars 39 through 42 of the commutators 33 are engaged by two brushes 61 and 64. Commutator sections 39 and 41 are interconnected and connected through switch 60 to 28 volt D.C., and commutator sections 40 and 42 are likewise interconnected and connected to ground. It is apparent that during rotation of the brushes 61 and 64 in clockwise direction, brush 61 will be connected to the 28 volt source while brush 64 is connected to ground, and in this manner a permanent magnet field type D.C. motor 65, of the reversible type will be energized for rotation in one direction. Conversely upon rotation, or angular movement, of the brushes 61 and 64 in the opposite direction, brush 64 will be connected to the 28 volt source while brush 61 is connected to ground and thus the motor 65 will be energized for rotation in the opposite direction. The motor 65 drives the wiper 66 associated with the differential potentiometer 35. As alluded to hereinbefore, the output frequency of the propeller driven alternators, or tachometer generators 22 is proportional to propeller speed, and the phase of the output voltage is maintained at a fixed relationship with respect to blade position by means of the exact four to one gear ratio between the propeller and the alternator. Thus, the differential electric motor excited by the alternator will rotate an exact amount for 90° rotation of the propeller. In this manner, each angular position of the differential electric motor indicates a specific relative position of the propeller blade. Moreover, since the motors 24 are of the differential type, the angular position of the rotor shaft indicates the relative phase relationships between the master and slave propellers. Furthermore, since one-half revolution of the differential motor rotor indicates a 90° rotation of the propeller, an optimum condition is obtained only once during every half revolution of the differential motor. Thus, when the differential rotor is stationary, speed synchronization will have been obtained, and in addition when the differential motor rotor is stationary at a predetermined angular position, the desired phase relationship exists. The commutators 33 are split, as shown, and have two small dead bands equivalent substantially to two degrees of relative blade position shift. Whenever the brushes 61 and 64 are not within this dead band range, the permanent magnet direct current motor 65 will be energized in one direction or the other dependent upon the direction of phase displacement. As mentioned hereinbefore, the motor 65 positions the wiper of the potentiometer. Furthermore, the winding of the potentiometer 35 is driven by the output shaft of the differential electric motor, and thus the relative motion between the wiper and the winding depends upon the relative movement between the differential electric motor 24 and the D.C. motor 65. The signal picked off the differential potentiometer 35 includes first, a component proportional to the speed integral or phase relation between the master and slave propellers and second, a component which utilizes phase error to apply a correcting signal proportional to time whenever a phase error exists. In addition, the electronic control system to be described also includes inputs proportional to the speed derivative, or rate of change of speed of the slave propeller with respect to the master propeller and in addition a signal proportional to the difference in the instantaneous speeds of the master and slave propellers.

Figure 3A:
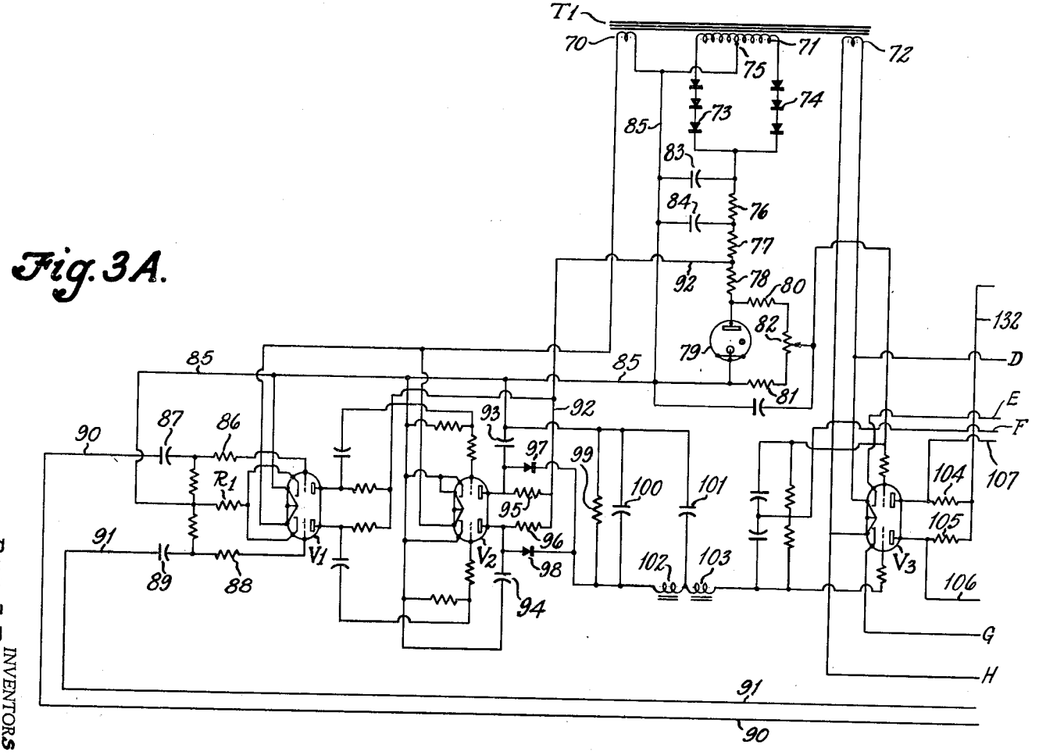
FIGURES 3A and 3B are schematic drawings of the electronic control system.
Figure 3B:
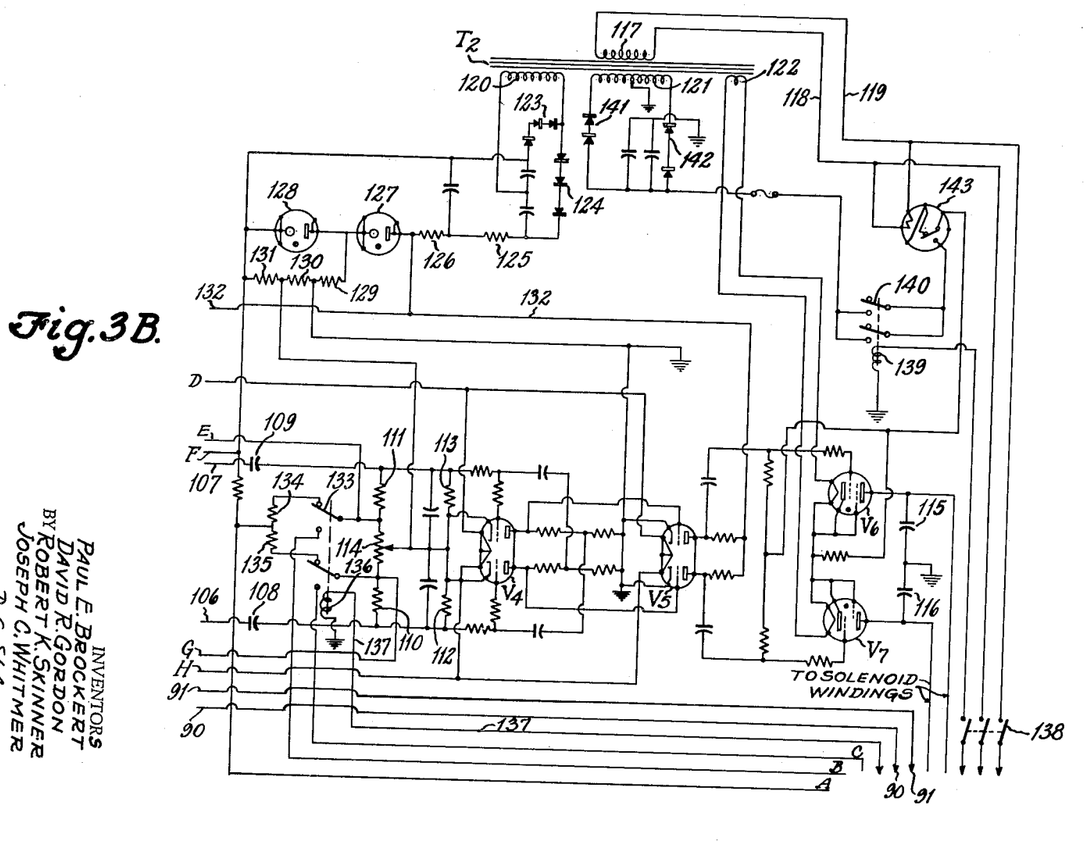

With particular reference to FIGURES 3A and 3B, the electronic control system will be described. It is pointed out that each propeller includes an electronic control system of the type to be described. As seen in FIGURE 3A, a power transformer T–1, the primary winding of which is not shown, is energized from a suitable source of alternating current. The transformer T–1 includes three secondary windings 70, 71 and 72. The secondary windings 70 and 72 are employed as filament voltage supplies for the tubes V–1, V–2, V–3, V–4 and V–5. The secondary winding 71 has its ends connected to selenium rectifier banks 73 and 74, and is also center tapped at 75. The rectifiers 73 and 74 are connected to produce a full wave rectifier, and the direct current voltage produced thereby is applied across a voltage divider comprising resistors 76, 77, 78 and a voltage reference tube 79, which is shunted by resistors 80, 81 and potentiometer 82. Resistor 76 is connected to the center tap of the secondary winding 71 of the transformer T–1 through a capacitor 83. In addition, the junction between resistor 76 and 77 is connected with the center tap wire 75 by a capacitor 84. The upper end of the capacitor 83 constitutes the negative voltage supply which is connected by a wire 85 to the cathodes of tube V–2 as well as one side of the voltage reference tube 79. The cathodes of tube V–1 are connected through resistor R1 to wire 85 as well as one side of the voltage reference tube 79. The grinds of the tube V–1 are connected through resistor condenser combinations 86, 87 and 88, 89 respectively to wires 90 and 91, which in turn are connected to one phase, or winding, of a tachometer generator. Therefore, a frequency proportional to propeller speed is impressed upon the grids of the tube V–1. The plate voltage for tubes V–1 and V–2 is derived from the voltage divider between resistors 77 and 78 and is applied to the tubes V–1 and V–2 by a wire 92.

The signal applied to the grids of the tube V–1 is amplified and clipped, and is then impressed upon the grids of the tube V–2. Since the plates and cathodes of the tube V–2 are interconnected through capacitors 93 and 94, when each tube side is cut off by the half of the alternating current signal from the tachometer generator, the capacitors 93 and 94 charge through resistors 95 and 96 respectively. The long time constant RC circuit is frequently sensitive, and the voltage across resistors 95 and 96 is rectified by selenium rectifiers 97 and 98 respectively. The voltage appearing across resistor 99 is proportional to the speed of propeller rotation, or in other words proportional to the frequency of the tachometer generators signal. This signal is filtered by a filter network including capacitors 100, 101 and coils 102 and 103.

The direct current signal proportional to propeller speed, or alternator frequency, is applied to one grid of tube V–3. More accurately, the rectified direct current voltage proportional to the propeller speed is applied to the lower grid of tube V–3, while the upper grid of tube V–3 is connected to the potentiometer 82 of the voltage divider network associated with the power supply. The potentiometer 82 is adjusted so that a constant voltage is maintained on the upper grid of tube V–3, and when the propeller is on speed, the voltage on the upper and lower grid sections of tube V–3 will be nearly equal with the difference voltage constant. When there is a zero, or constant, difference potential between the upper and lower grids of tube V–3, there will be a zero, or constant, output voltage of the tube V–3 developed across resistors 104 and 105. However, when the propeller is accelerating or decelerating a varying potential will be developed across resistors 104 and 105 due to the difference in potential on the upper and lower grids of tube V–3. This voltage is applied by wire 106 and by wire 107 to a differentiating circuit comprising condensers 108 and 109 respectively which are connected in series with parallel resistors 110, 112, and 111 and 113. The lower ends of resistors 110 and 111 are connected to the ends of a balancing potentiometer 114. The differential output signal which is proportional to the rate of change of propeller speed is applied to the grids of the tube V–4. Tube V–4 is connected in a multivibrator circuit, and normally produces a series of pulses of equal time duration on both sections. However, with a voltage proportional to rate of change of propeller speed being applied to the grids, the time duration of the pulses is altered and applied to the grids of an amplifier tube V–5. The output of the amplifier tube V–5 is capacitor coupled to a pair of thyratron tubes V–6 and V–7. The plates of the thyratron tubes V–6 and V–7 are connected to capacitors 115 and 116, the other ends of which are connected to ground. This capacitor circuit in the plates of the thyratron tubes constitutes an oscillating circuit which develops a frequency signal in the high audio range. Thus, the oscillating signal periodically reduces the plate voltage on the thyratrons to zero so as to cut the tubes off when the grid voltage is below a predetermined value.

The tubes V–4 and V–5, V–6 and V–7 include an independent power supply including a transformer T–2 having a primary winding 117 which is connected by wires 118 and 119 to a suitable source of alternating current. The transformer T–2 includes secondary windings 120, 121 and 122. Secondary winding 122 constitutes the filament supply for the thyratron tubes V–6 and V–7. The tubes V–4 and V–5 derive their filament supply voltages from the windings 72 of the transformer T–1. The secondary winding 120 is connected in a half wave voltage doubler rectifier circuit including selenium rectifier banks 123 and 124 the output of which is connected across a voltage divider including resistors 125, 126, voltage reference tube 127 and 128, the voltage reference tubes 128 being shunted by a resistor network including resistors 129, 130 and 131. The plate voltage supplies for tubes V–3, V–4 and V–5 are derived from wire 132 which is connected between the reference tube 127 and the resistor 126. The cathode voltage supply for tube V–4 is obtained between resistors 130 and 131, and the cathodes of tube V–5 are connected to ground. The potentiometer 114 can be connected in a bridge circuit with the differential potentiometer 35 disclosed in FIGURE 1. Normally, when the synchrophasing system is not to be used, the potentiometer 114 is connected by switch 133 to form a bridge circuit with resistors 134 and 135. The switch 133 can be actuated by a relay 136 which is connected to a wire 137. Wire 137 is connected with the switch 60, so that when it is desired to synchrophase the propellers, the relay 136 is energized so that the switch 133 moves from the upper position to the lower position.

However, when the switch 133 is in the upper position, the only output of the electronic control circuit is the acceleration signals. The acceleration signals are employed to energize the solenoid valve, to be described, so as to prevent undesirable hunting of the propellers about the selected constant speed. The electronic control circuit can be disconnected from the solenoid valve by opening switch 138, which controls a relay coil 139. When relay coil 139 is energized, switch 140 is closed. When switch 140 is closed, the power supply derived from secondary winding 121 which is of the full wave rectifier type including selenium rectifier banks 141 and 142, is connected through a time delay thermal relay 143 to the plates of the thyratron tubes V–6 and V–7. The thermal relay 143 introduces a time lag of approximately fifteen seconds before applying voltage to the plates of the thyratrons V–6 and V–7 in order to permit the filaments V–6 and V–7 to be properly heated. In this connection it is noted that switch 138 also controls the alternating current supply to the transformer T–2.

However, when it is desired to synchrophase, the switch 60, alluded to hereinbefore, is closed. When the switch 60 is closed, the potentiometer 114 connected in a bridge circuit with the differential potentiometer 35. The signals across the differential potentiometer 35 are proportional to the speed integral constant between the master and slave propellers and the phase error rate signal. A portion of the voltage appearing across the differential potentiometer 35 is used to control potentials of tube V–3. The amplified signal is then differentiated by the RC network including condenser 108 and resistors 110 and 112, and condenser 109 and resistors 111 and 113 so as to produce a voltage proportional to the instantaneous speed difference between the master and slave propellers. Thus, when the synchrophasing circuit is closed, the grids of tube V–4 have applied thereto a signal proportional to propeller acceleration or deceleration, instantaneous difference speed between the master and slave propellers, the speed integral constant and the phase error rate signal. Thus, the output of the multivibrator circuit associated with tube V–4 is modified by the four input signals, and the output of the multivibrator amplified by tube V–5 and applied to the thyratrons V–6 and V–7, which in turn energize the solenoid valve to be described.

Figure 4:
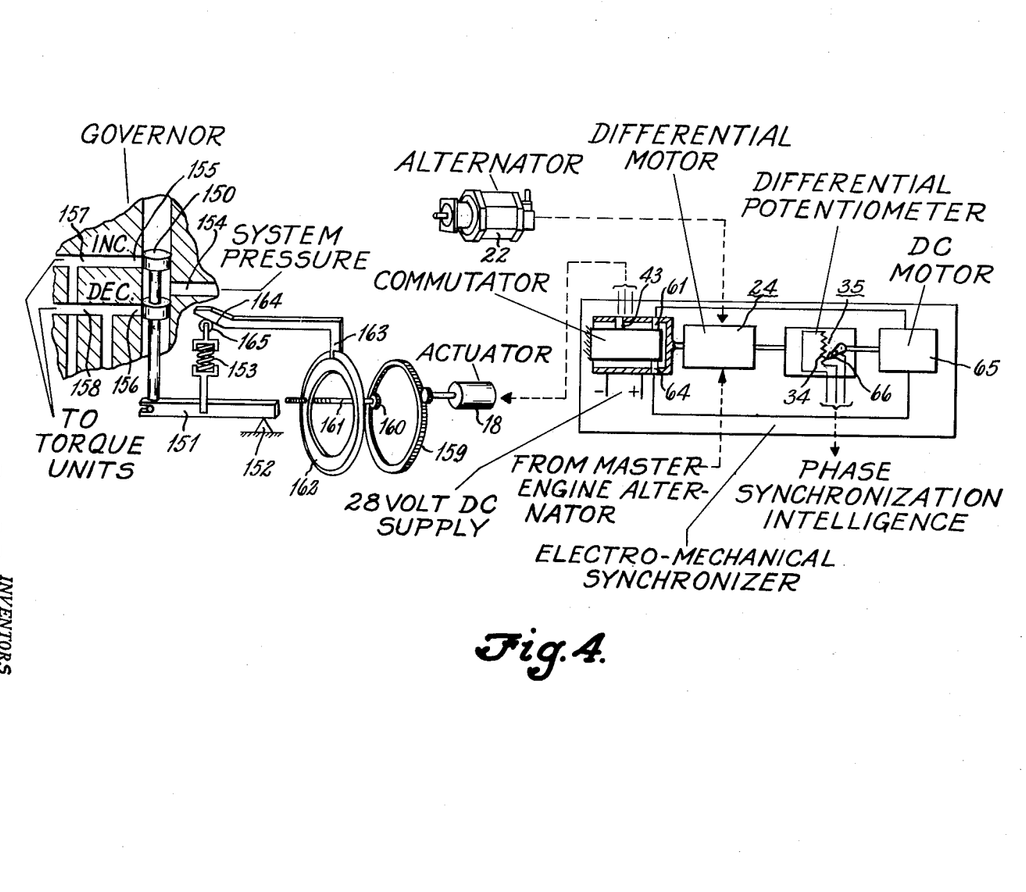
FIGURE 4 is a composite electrical and hydraulic schematic of the electro-mechanical speed synchronizer.

With particular reference to FIGURE 4, the electromechanical synchronizer in composite form will be described. As shown therein, the propeller includes a centrifugally responsive governor valve 150, one end of which is articulated to the end of a lever 151. The lever 151 is movable about a fulcrum 152 in response to centrifugal force acting on the lever 151 and the valve 150. Upward movement of the valve 150 and the lever 151 is opposed by a compression spring 153. The valve 150, is shown schematically, and includes a pressure supply port 154 and a pair of control ports 155 and 156. The control ports 155 and 156 are connected respectively to passages 157 and 158 which in turn connect with opposed chambers of the pitch varying torque units, not shown. Accordingly, during upward movement of the valve 150, pressure will be applied to passage 157 to as to increase propeller pitch while passage 158 is connected to drain. Conversely during downward movement of the valve 150, the passage 157 will be connected to the drain and the passage 158 connected to pressure so as to decrease propeller pitch.

As alluded to hereinbefore, during the on-speed condition of the propeller, the centrifugal force acting on the valve 150 and lever 151 is exactly balanced, or in equilibrium, with the force of the spring 153. The propeller driven alternator, or tachometer generator, 22 is shown having its output applied to the differential electric motor 24. The rotor windings of the differential electric motor are energized from the master alternator. Upon a speed difference between the master and slave propellers, the differential motor will be actuated and will drive the commutator brush 43. The commutator 32 in turn will energize the actuator motor 18, which motor is of the continuous rotation type in contradistinction to a stepping type motor. The actuator motor 18 drives a ring gear 159 which drives a pinion gear 160 that in turn rotates a high lead screw 161. The high lead screw 161 threadedly engages a control ring 162 which is disposed within the rotating regulator, and in this manner, linear movement is imparted to the control ring 162. Control ring 162 is engaged by a control shoe 163 which rotates with the regulator and has a mechanical slip ring connection with the ring 162. A control shoe 163 is shown integral with a cam 164 which coacts with a roller 165 for adjusting the stress of the governor spring 153. To recapitulate, the actuator motor 18 rotates at a rate and in a direction dependent upon the difference in speed between the master and slave propellers so as to reset the governor valve spring 153 so as to obtain speed synchronization between the master and slave propellers. When speed synchronization between the master and slave propellers is obtained, the differential electric motor 24 will be stationary.

Figure 5:
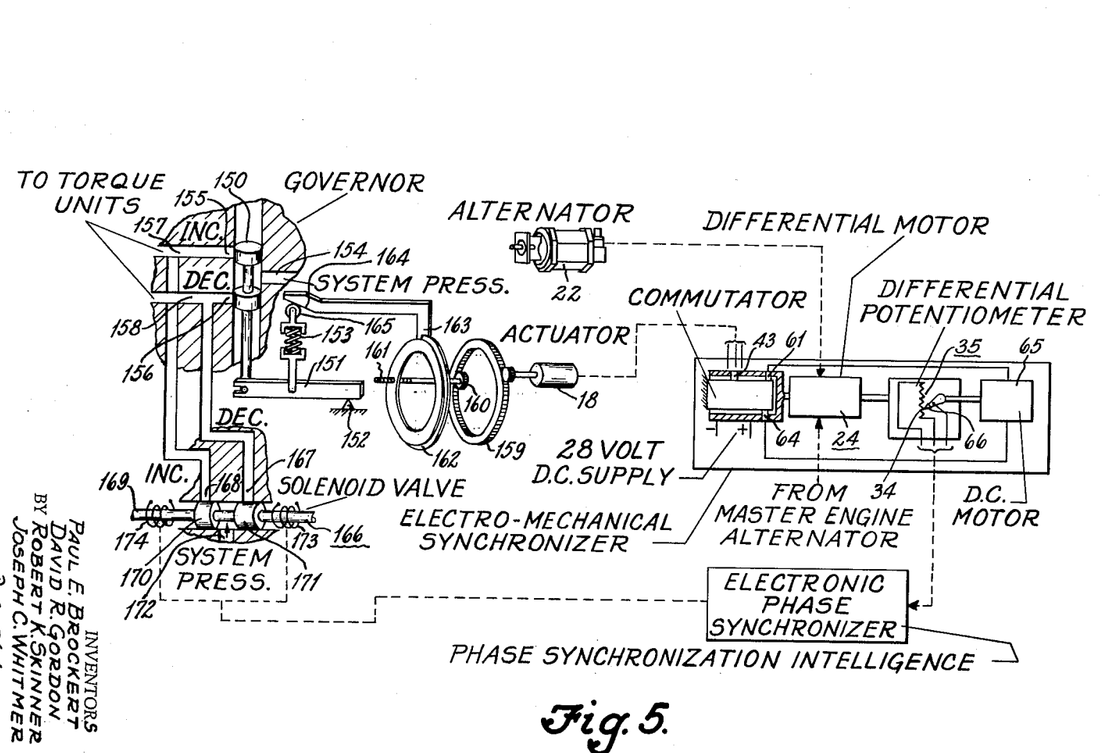
FIGURE 5 is a composite electrical and hydraulic schematic of the phase synchronizer.

With reference to FIGURE 5, wherein similar numerals denote similar parts described in FIGURE 4, it can be seen that passages 157 and 158 are likewise connected to the outlet ports 168 and 167 of a solenoid valve 166. The solenoid valve 166 includes a plunger 169 having spaced lands 170 and 171 which cooperate with ports 168 and 167 respectively. The solenoid valve also includes a pressure inlet port 172. The solenoid valve plunger 169 is normally centered so as to close the ports 168 and 167 by a pair of opposed springs, not shown. The valve plunger 169 can be moved in either direction by energizing solenoid windings 173 and 174. The output of the electronic circuit, hereinbefore described, is such that the solenoid valve plunger 169 is continuously pulsed on either side of the central position shown during operation of the electronic circuit. The duration, or time, of the pulses is varied by the input to the multivibrator. When only the acceleration control is employed, the time duration of the pulses, or pulse ratio, of the solenoid valve is controlled in response to acceleration so as to prevent undesirable propeller hunting. However, when the synchrophasing circuit is connected the solenoid valve is actuated so as to obtain the desired phase relationship between the master and slave propellers.

Thus, as seen in FIGURE 5 the slave alternator 22 has an input connection to the differential electric motor 24, as does the master alternator. The differential electric motor 24 drives the commutator brushes 61 and 64 which energizes the direct current motor 65. In addition, the differential electric motor drives the windings of the differential potentiometer 35. The signal developed across the differential potentiometer 35 is applied to the electronic circuit disclosed in FIGURES 3A and 3B, and the output of this electronic circuit is applied to the coils 173 and 174 of the solenoid valve. The net flow from the solenoid valve 166 is determined by the pulse ratio and this flow is used to bias the hydraulic governor valve 150. In so doing, the desired phase relationship between the propeller blades of the master and slave propellers can be maintained.

From the foregoing it is apparent that the present invention provides an electronic control responsive to acceleration for improving governor operation; an electromechanical synchronizer for synchronizing a plurality of slave propellers to the speed of a master propeller; and in addition, an electronic phase synchronizing system for obtaining a predetermined phase relationship between the slave propellers and the master propeller. Moreover, the several arrangements can be used independently so as to obtain the desired propeller operation.

While the embodiment of the present invention as herein disclosed constitutes a preferred form, it is to be understood that other forms might be adopted.

What is claimed is as follows:

1. Control means for a plurality of variable pitch propellers, one propeller being a master and the other propellers being slaves thereto, each slave propeller including power means for varying propeller pitch to vary the speed of propeller rotation, a speed governor having a nominal speed setting for controlling said power means so as to maintain propeller speed substantially constant, and means developing a signal indicative of the speed of propeller rotation, including in combination, means developing a signal indicative of a speed of the rotation of the master propeller, means comparing the speed signals of the master and slave propellers for producing error output signals proportional to the speed difference between the master and the slave propellers, motor means energized by the error output signals for resetting the governor of the slave propellers to synchronize the speeds of the slave propellers with that of the master propeller manually operable selector means having a first position wherein the speeds of the slave propellers are synchronized with the speed of the master propeller and a second position wherein the speeds of the slave propeller are not synchronized with the speed of the master propeller, and means controlling the energization of said motor means when the selector means is in the second position to automatically obtain the nominal speed setting of the governors of the slave propellers.

2. Control means for a plurality of variable pitch propellers, one propeller being a master and the other propellers being slaves thereto, including in combination, power means for varying the propeller pitch to control the speed of propeller rotation, a centrifugally responsive governor having a nominal speed setting for controlling the power means of each propeller so as to maintain propeller speed substantially constant, means developing a signal indicative of a speed of rotation of the master and slave propellers, means comparing the speed signals of the master and slave propellers for producing an error output signal proportional to the speed difference between the master and slave propellers, motor means energized by the error output signals for resetting the centrifugal governors of the slave propellers to synchronize the speeds of the slave propellers with that of the master propeller manually operable selector means having a first position wherein the speeds of the slave propellers are synchronized with the speed of the master propeller and a second position wherein the speeds of the slave propeller are not synchronized with the speed of the master propeller, and means controlling the energization of said motor means when the selector means is in the second position to automatically obtain the nominal speed setting of the governors of the slave propellers.

3. Control means for a plurality of variable pitch propellers, one propeller being a master and the other propellers being slaves thereto, including in combination, power means for varying propeller pitch to control the speed of the propellers, a centrifugally responsive speed governor having a nominal speed setting for controlling the power means of each propeller so as to maintain propeller speed substantially constant, a generator driven by each propeller for developing a signal proportional to the speed of propeller rotation, means comparing the speed signals of the master and slave propellers for producing an error output signal proportional to the speed difference between the master and slave propellers, commutating means actuated by said speed comparing means, an electric motor means for each slave propeller energized through said commutating means for resetting the centrifugally responsive speed governor of the slave propeller to synchronize the speeds of the slave propellers with that of the master propeller manually operable selector means having a first position wherein the speeds of the slave propellers are synchronized with the speed of the master propeller and a second position wherein the speeds of the slave propeller are not synchronized with the speed of the master propeller, and means controlling the energization of said motor means when the selector means is in the second position to automatically obtain the nominal speed setting of the governors of the slave propellers.

4. Control means for a plurality of variable pitch propellers, one propeller being the master and the other propellers being slaves thereto, including in combination, power means for varying propeller pitch to control the speed of propeller rotation, a speed governor for controlling said power means so as to maintain propeller speed substantially constant, an alternating current generator driven by each propeller for developing a signal indicative of the phase of its respective propeller, a differential electric motor for comparing the phase signals of the master and slave propellers and producing an output proportional to the phase difference between the master and slave propellers, and continuously operable means independent of said speed governor and controlled by the output of said differential electric motor for actuating the power means to vary the pitch of the slave propellers, and thus modify the operation of the speed governor of each slave propellers so as to maintain a predetermined phase relationship between the master and slave propellers.

5. Control means for a plurality of variable pitch propellers, one propeller being the master and the remaining propellers being slaves thereto, including in combination, power means for each propeller capable of varying propeller pitch to control propeller speed, a speed governor for controlling said power means so as to maintain propeller speed substantially constant, an alternator driven by each propeller for developing a signal indicative of the phase of its respective propeller, each propeller having N number of blades, each alternator being driven at N times the propeller speed, a differential electric motor for comparing the phase signals between each slave propeller alternator and the master propeller alternator, each differential motor rotating $$\frac{N}{X}$$

times, for a phase error between master and slave propellers equal to 360° where $$X = \frac{PM}{PA} \quad \begin{array}{l}(PM = \text{number of differential motor poles}) \\ (PA = \text{number of alternator poles})\end{array}$$

means actuated by each differential electric motor for producing an error output signal proportional to the phase difference between its respective slave propeller and the master propeller, and means energized by each error output signal for modifying the operation of the speed governor of its respective slave propeller to maintain a predetermined phase relationship between the master and slave propellers.

6. Control means for a plurality of variable pitch propellers, one propeller being the master and the other propellers being slaves thereto, including in combination, power means for each propeller capable of varying propeller pitch to control propeller speed, a speed governor for controlling the power means so as to maintain propeller speed substantially constant, an alternator driven by each propeller for producing an electric signal indicative of the phase of each propeller, each propeller having N number of blades, each alternator being driven at a speed of N times the speed of propeller rotation, a differential electric motor for comparing the phase signals of each slave propeller alternator with that of the master propeller alternator and producing an error output proportional to the phase difference between each slave propeller and the master propeller, the arrangement being such that each differential motor makes one revolution for a phase error of $$360° \times \frac{X}{N}$$

where $$X = \frac{PM}{PA} \quad \begin{array}{l}(PM = \text{number of differential motor poles}) \\ (PA = \text{number of alternator poles})\end{array}$$

means controlled by the output of each differential electric motor for producing an error output signal proportional to the phase difference between each slave propeller and the master propeller, and means energized by the error output signal for modifying the operation of the speed governor of each slave propeller so as to maintain a predetermined phase relationship between each slave propeller and the master propeller.

7. The control means set forth in claim 6 wherein the means controlled by the output of each differential electric motor comprises a differential potentiometer.

8. The control means set forth in claim 6 wherein the means energized by the error output signal comprises an electronic control system having an input including signals proportional to the phase relation between the master and slave propellers, the phase error rate between the master and slave propellers, the speed derivatives between the master and slave propellers and instantaneous speed differences between the master and slave propellers, said electronic control circuit having an output comprising pulses which are modulated by the input signals.

9. The control means set forth in claim 8 wherein the means controlled by the output of each differential electric motor comprises a differential potentiometer, and wherein the input signals for the electronic control system which are proportional to the phase relation between the master and slave propellers and the phase error rate are derived from said differential potentiometer.

10. Control means for a plurality of variable pitch propellers, one propeller being the master and the other propellers being slaves thereto, including in combination, power means for varying the pitch of each propeller so as to control the speed thereof, a speed governor for controlling said power means so as to maintain propeller speed substantially constant, means associated with each propeller for developing a signal indicative of the phase and speed thereof, means comparing the speed signals of the master and slave propellers' for producing an error output signal proportional to the speed difference between the master and slave propellers, means comparing the phase signals of the master and slave propellers for producing an error signal proportional to the phase error between the master and slave propellers, manually operable means for selecting either of said error output signals, and means energized by the selected error output signal for modifying the operation of the speed governor of the slave propellers.

11. Control means for a plurality of variable pitch propellers, one propeller being selected as the master and the remaining propellers being slaves thereto, including in combination, power means for adjusting propeller pitch to control propeller speed, a centrifugally responsive speed governor for each propeller capable of controlling said power means so as to maintain propeller speed substantially constant, means driven by each propeller for developing a signal indicative of the speed and phase of its respective propeller, means for comparing the speed and phase signals of the master and slave propellers for producing error output signals proportional to both the speed and phase difference between the master and slave propellers, means capable of being energized by the speed error output signal, means capable of being energized by the phase error output signal, and manually operable means for selecting either of said last recited means so as to modify the operation of the centrifugally responsive governor and maintain either speed synchronization between the slave and master propellers or a predetermined phase relationship between the master and slave propellers.

12. Control means for a plurality of variable pitch propellers, including in combination, power means for each propeller capable of varying propeller pitch to control propeller speed, a speed governor for each propeller controlling said power means so as to maintain propeller speed substantially constant, means for selecting either of two propellers as a master to which the remaining propellers are slaves, an alternating current generator driven by each propeller for developing a signal indicative of the phase and speed of its respective propeller, means comparing the speed and phase signals of the master and slave propeller driven generators for producing error outputs proportional to the speed and phase difference between the master and slave propellers, means capable of being energized by the speed error output, means capable of being energized by the phase error output, and selector means for selecting either of said last recited means so as to modify the operation of the speed governor and maintain either a predetermined phase relationship between the master and slave propellers or synchronize the speed of the master and slave propellers.

13. Control means for a plurality of variable pitch propellers including in combination, power means for varying the propeller pitch to control the speed of propeller rotation, a speed governor for controlling the power means so as to maintain propeller speed substantially constant, means for selecting one of two propellers as a master to which the remaining propellers are slaves, an alternating current generator driven by each propeller for developing a signal indicative of the phase and speed of its respective propeller, a differential electric motor for comparing the speed signals produced by the master and slave propeller generators for producing error outputs proportional to the phase and speed difference between the master and slave propellers, means capable of being energized by the speed error output, means capable of being energized by the phase error output, and selector means for selecting either of the last recited means so as to synchronize the speeds of the master and slave propellers or to maintain a predetermined relationship between the phase of the master and slave propellers by modifying the operation of the speed governor.

14. Control means for a plurality of variable pitch propellers, one being the master and the remaining propellers being slaves thereto, including in combination, fluid pressure actuated means for varying propeller pitch to control propeller speed, a centrifugally responsive speed governor operated valve for controlling the fluid pressure actuated means so as to maintain propeller speed substantially constant, means driven by each propeller for developing a signal indicative of the phase and speed of its respective propeller, means comparing the speed and phase signals of the master and slave propellers for producing error output signals proportional to the speed and phase difference between the master and slave propellers, means capable of being energized by the speed error output signal for synchronizing the speeds of the master and slave propellers by resetting the centrifugally responsive speed governor operated valve including an actuator for resetting the speed responsive governor, means capable of being energized by the phase error output signal for maintaining a predetermined phase relationship between the master and slave propellers including an electrically actuated valve connected in parallel with the speed responsive valve for modifying the operation of the speed governor operated valve to maintain a predetermined phase relationship between the master and slave propellers, and manually operable means for selecting either of the two last recited means.

15. Control means for a plurality of variable pitch propellers, one propeller being the master and the remaining propellers being slaves thereto, including in combination, power means for varying propeller pitch to control the speed of propeller rotation, a speed governor for controlling the power means so as to maintain propeller speed substantially constant, means developing a signal indicative of the phase and speed of each propeller, means for comparing the speed and phase signals of the master and slave propellers for producing error output signals proportional to the speed and phase difference between the master and slave propellers, means capable of being energized by the speed error output signal for synchronizing the speed of the master and slave propellers by resetting the speed governor of the slave propellers, means capable of being energized by the phase error signal for maintaining a predetermined phase relationship between the master and slave propellers by biasing the speed governor, means for differentiating the speed signal of each propeller so as to obtain a signal in proportion to the rate of change of propeller speed for biasing the speed governor, and manually operable means for selecting any one of said last three recited means.

16. Control means for a plurality of variable pitch propellers, one propeller being the master and the remaining propellers being slaves thereto, including in combination, power means for each propeller capable of varying propeller pitch to control propeller speed, a speed governor for controlling said power means so as to maintain propeller speed substantially constant, an alternator driven by each propeller for developing a signal indicative of the phase of its respective propeller, each propeller having N number of blades, each alternator being driven at N times the propeller speed, a differential electric motor for comparing the phase signals between each slave propeller alternator and the master propeller alternator, means actuated by each differential electric motor for producing an error output signal proportional to the phase difference between its respective slave propeller and the master propeller, and means energized by each error output signal for modifying the operation of the speed governor of its respective slave propeller to maintain a predetermined phase relationship between the master and slave propellers.

17. Control means for a plurality of variable pitch propellers, one propeller being the master and the remaining propellers being slaves thereto, including in combination, power means for each propeller capable of varying propeller pitch to vary propeller speed, a speed governor for controlling said power means so as to maintain propeller speed substantially constant, an alternator driven by each propeller for developing a signal indicative of the phase of its respective propeller, each propeller having N number of blades, each alternator being driven at a multiple of propeller speed such that any one blade out of said N number of blades can be detected for phase control, a differential electric motor for comparing the phase signals between each slave propeller alternator and the master propeller alternator, means actuated by each differential electric motor for producing an error output signal proportional to the phase difference between its respective slave propeller and the master propeller, and means energized by each error output signal for modifying the operation of the speed governor of its respective slave propeller to maintain a predetermined phase relationship between the master and slave propellers.

18. Control means for a plurality of variable pitch propellers, one propeller being the master and the other propellers being slaves thereto, including in combination, power means for each propeller capable of varying propeller pitch to control propeller speed, a speed governor for controlling the power means of each propeller so as to maintain propeller speed substantially constant, an alternator driven by each propeller for producing an electric signal indicative of the phase of speed of each propeller, each propeller having N number of blades, each alternator being driven at a speed of N times the speed of propeller rotation, a differential electric motor for comparing the speed and phase signals of each slave propeller alternator with that of the master propeller alternator and producing an error output proportional to the speed and phase difference between each slave propeller and the master propeller, the arrangement being such that each differential motor makes one revolution for a speed and phase error of $$360° \times \frac{X}{N}$$

where $X = \frac{PM}{PA}$ ($PM$ = number of differential motor poles)
($PA$ = number of alternator poles)

means controlled by the output of each differential electric motor capable of producing either an error output signal proportional to the phase difference between each slave propeller and the master propeller or an error output signal proportional to the speed difference between each slave propeller and the master propeller, manually controlled means for selecting either of said error output signals, and means energized by the selected error output signal for modifying the operation of the speed governor of each slave propeller.

19. Control means for a plurality of variable pitch propellers, one propeller being the master and the remaining propellers being slaves thereto, including in combination, power means for varying propeller pitch to control propeller speed, a speed governor for controlling the power means so as to maintain propeller speed substantially constant, means developing a signal indicative of the speed of each propeller, means comparing the signals of the master and slave propellers for producing an error output signal proportional to the speed difference between the master and slave propellers, a motor capable of being energized by the error output signal for resetting the governor of each slave propeller to synchronize the speeds of the slave propellers with that of the master propeller, first manually operable selector means having a first position wherein the speeds of the slave propellers are synchronized with the speed of the master propeller and a second position wherein the speeds of the slave propellers are not synchronized with the speed of the master propeller, means controlling the energization of said motor when said first selector means is in the second position to automatically obtain the nominal speed setting of the governors of the slave propellers, and second manually operable selector means including means controlling the energization of said motor to reset the governors of all the propellers to obtain a speed setting higher than the nominal speed setting when the first manually operable selector means are in the first position.

20. Control means for a plurality of variable pitch propellers, one propeller being the master and the remaining propellers being slaves thereto, including in combination, power means for each propeller capable of varying propeller pitch to control propeller speed, a speed governor for controlling said power means so as to maintain propeller speed substantially constant, signal generating means driven by each propeller for generating a signal indicative of the phase of its respective propeller, each propeller having N number of blades, each signal generating means being driven at N times propeller speed, means for comparing the phase signals between each slave propeller generating means and the master propeller generating means and producing an error output signal proportional to the phase difference between each slave propeller and the master propeller, and means energized by each error output signal for modifying the operation of the speed governor of its respective slave propeller to maintain a predetermined phase relationship between the master and slave propellers.

21. Control means for a plurality of variable pitch propellers, one propeller being the master and the remaining propellers being slaves thereto, including in combination, power means for each propeller capable of varying propeller pitch to control propeller speed, a speed governor for controlling said power means so as to maintain propeller speed substantially constant, signal generating means driven by each propeller for generating a signal indicative of the phase of its respective propeller, each propeller having N number of blades, each signal generating means being driven at a multiple of propeller speed such that any one blade out of said N number of blades can be detected for phase control, means for comparing the phase signals between each slave propeller generating means and the master propeller generating means and producing an error output signal proportional to the phase difference between each slave propeller and the master propeller, and means energized by each error output signal for modifying the operation of the speed governor of its respective slave propeller to maintain a perdetermined phase relationship between the master and slave propellers.

References Cited in the file of this patent

UNITED STATES PATENTS

| | | |
|---|---|---|
| 2,399,772 | Wahlberg | May 7, 1946 |
| 2,410,659 | Hoover | Nov. 5, 1946 |
| 2,423,400 | Nichols | July 1, 1947 |
| 2,431,687 | Drake | Dec. 2, 1947 |
| 2,482,812 | Treseder | Sept. 27, 1949 |
| 2,517,703 | Offner | Aug. 8, 1950 |
| 2,673,309 | Light et al. | Mar. 23, 1954 |
| 2,679,908 | Treseder | June 1, 1954 |
| 2,747,141 | Hine | May 22, 1956 |
| 2,756,012 | Moore et al. | July 24, 1956 |
| 2,761,518 | Treseder et al. | Sept. 4, 1956 |